United States Patent
Liu et al.

(10) Patent No.: US 8,557,442 B2
(45) Date of Patent: Oct. 15, 2013

(54) NANOCOMPOSITE OF GRAPHENE AND METAL OXIDE MATERIALS

(75) Inventors: Jun Liu, Richland, WA (US); Ilhan A. Aksay, Princeton, NJ (US); Daiwon Choi, Richland, WA (US); Donghai Wang, Richland, WA (US); Zhenguo Yang, Richland, WA (US)

(73) Assignees: Battelle Memorial Institute, Richland, WA (US); Trustees of Princeton University, Princeton, NJ (US)

( * ) Notice: Subject to any disclaimer, the term of this patent is extended or adjusted under 35 U.S.C. 154(b) by 0 days.

(21) Appl. No.: 13/559,528

(22) Filed: Jul. 26, 2012

(65) Prior Publication Data
US 2012/0295096 A1 Nov. 22, 2012

Related U.S. Application Data

(62) Division of application No. 12/460,993, filed on Jul. 27, 2009, now Pat. No. 8,257,867.

(60) Provisional application No. 61/084,140, filed on Jul. 28, 2008.

(51) Int. Cl.
| | |
|---|---|
| *H01M 4/13* | (2010.01) |
| *H01M 4/58* | (2010.01) |
| *H01M 4/02* | (2006.01) |
| *B05D 7/00* | (2006.01) |

(52) U.S. Cl.
USPC ............ 429/231.5; 429/212; 429/231.4; 429/231.8; 429/209; 427/212

(58) Field of Classification Search
USPC ............ 429/231.5, 231.8, 231.4, 218.1, 209; 427/212
See application file for complete search history.

(56) References Cited

U.S. PATENT DOCUMENTS

| | | |
|---|---|---|
| 5,972,088 A | 10/1999 | Krishnan et al. |
| 6,264,741 B1 | 7/2001 | Brinker et al. |
| 6,492,014 B1 | 12/2002 | Rolison et al. |
| 7,001,669 B2 | 2/2006 | Lu et al. |
| 7,094,499 B1 | 8/2006 | Hung |
| 7,176,245 B2 | 2/2007 | Stucky et al. |
| 7,309,830 B2 | 12/2007 | Zhang et al. |
| 7,623,340 B1 | 11/2009 | Song et al. |
| 8,257,867 B2 | 9/2012 | Liu et al. |

(Continued)

FOREIGN PATENT DOCUMENTS

| | | |
|---|---|---|
| CN | 1483212 | 3/2004 |
| CN | 1588679 | 3/2005 |

(Continued)

OTHER PUBLICATIONS

USP Reference Standard MSDS Sodium Lauryl Sulfate Previous Revision May 24, 2004 updated Oct. 28, 2010; USP Reockvill MD USA Document # 1614363.*

(Continued)

*Primary Examiner* — Patrick Ryan
*Assistant Examiner* — Aaron Greso
(74) *Attorney, Agent, or Firm* — Klarquist Sparkman, LLP

(57) ABSTRACT

Nanocomposite materials comprising a metal oxide bonded to at least one graphene material. The nanocomposite materials exhibit a specific capacity of at least twice that of the metal oxide material without the graphene at a charge/discharge rate greater than about 10 C.

11 Claims, 12 Drawing Sheets

(56) References Cited

U.S. PATENT DOCUMENTS

| | | | |
|---|---|---|---|
| 8,450,014 | B2 | 5/2013 | Liu et al. |
| 2002/0022122 | A1 | 2/2002 | Hirata et al. |
| 2002/0054995 | A1* | 5/2002 | Mazurkiewicz ............... 428/364 |
| 2002/0192137 | A1 | 12/2002 | Chaloner-Gill et al. |
| 2003/0086859 | A1* | 5/2003 | Kawakami et al. ........ 423/447.1 |
| 2004/0120880 | A1 | 6/2004 | Zhang et al. |
| 2004/0131934 | A1 | 7/2004 | Sugnaux et al. |
| 2004/0137225 | A1 | 7/2004 | Balkus, Jr. et al. |
| 2004/0150140 | A1 | 8/2004 | Zhan et al. |
| 2006/0154071 | A1 | 7/2006 | Homma et al. |
| 2007/0092432 | A1 | 4/2007 | Prud'homme et al. |
| 2007/0158618 | A1 | 7/2007 | Song et al. |
| 2007/0212538 | A1 | 9/2007 | Niu |
| 2007/0281854 | A1 | 12/2007 | Harbour et al. |
| 2008/0258359 | A1* | 10/2008 | Zhamu et al. .................. 264/673 |
| 2008/0279756 | A1 | 11/2008 | Zhamu et al. |
| 2008/0302561 | A1 | 12/2008 | Prud'homme et al. |
| 2008/0312368 | A1 | 12/2008 | Prud'homme et al. |
| 2009/0117467 | A1 | 5/2009 | Zhamu et al. |
| 2009/0246625 | A1 | 10/2009 | Lu |
| 2009/0290897 | A1 | 11/2009 | Doshoda et al. |
| 2009/0291270 | A1 | 11/2009 | Zettl et al. |
| 2009/0297947 | A1 | 12/2009 | Deng et al. |
| 2009/0305135 | A1 | 12/2009 | Shi et al. |
| 2010/0081057 | A1 | 4/2010 | Liu et al. |
| 2010/0143798 | A1 | 6/2010 | Zhamu et al. |
| 2010/0159366 | A1 | 6/2010 | Shao-Horn et al. |
| 2010/0176337 | A1 | 7/2010 | Zhamu et al. |
| 2011/0033746 | A1 | 2/2011 | Liu et al. |
| 2011/0045347 | A1 | 2/2011 | Liu et al. |
| 2011/0051316 | A1 | 3/2011 | Liu et al. |
| 2011/0111299 | A1 | 5/2011 | Liu et al. |
| 2012/0088158 | A1 | 4/2012 | Liu et al. |
| 2012/0295027 | A1 | 11/2012 | Liu et al. |
| 2012/0305165 | A1 | 12/2012 | Liu et al. |

FOREIGN PATENT DOCUMENTS

| | | |
|---|---|---|
| CN | 1793451 | 6/2006 |
| CN | 101048055 | 10/2007 |
| CN | 101139090 | 3/2008 |
| JP | 10233211 | 9/1998 |
| WO | WO2007/015710 | 2/2007 |
| WO | WO2007/061945 | 5/2007 |
| WO | WO2008/013380 | 1/2008 |
| WO | WO2008/106991 | 9/2008 |
| WO | WO2008/143692 | 11/2008 |
| WO | WO2009/023051 | 2/2009 |
| WO | WO2009/085015 | 7/2009 |
| WO | WO2010/014215 | 2/2010 |
| WO | WO2010/030361 | 3/2010 |
| WO | WO2011/019764 | 2/2011 |
| WO | WO2011/019765 | 2/2011 |

OTHER PUBLICATIONS

Kang et al. Journal of the Korean Electrochemical Society 2002, vol. 5, No. 2, pp. 52-56 Abstract and Figures).*
Wakihara (Lithium Ion Batteries Fundamentals and Performance; Wakihara et al. ed. 1998 New York Wiley).*
Murakami et al. (Materials Science forum vol. 445-446 2004 pp. 331-333 Abstract and Introduction).*
Lee (Journal of Power Sources vol. 90 2000 pp. 70-75).*
Bonard et al. (Advanced Materials 1997 vol. 9 No. 10 pp. 827-831.*
McAllister et al. (Chem. Mater. 2007 vol. 19 pp. 4396-4404).*
Wang et al. Journal of the Electrochemical Society vol. 151 No. 4 pp. A563-A570 2004.*
Novosolov et al. (Science, Oct. 22, 2004 vol. 306 pp. 666-669).*
Aksay et al., "Biomimetic Pathways for Assembling Inorganic Thin Films," *Science* 273:892-898 (Aug. 1996).
Aricò et al., "Nanostructured materials for advanced energy conversion and storage devices," *Nature Materials* 4:366-377 (May 2005).
Armstrong et al., "TiO$_2$-B Nanowires," *Angewandte Chemie-International Edition* 43:2286-2288 (Apr. 2004).
Armstrong et al., "TiO$_2$(B) Nanowires as an Improved Anode Material for Lithium-Ion Batteries Containing LiFePO$_4$ or LiNi$_{0.5}$Mn$_{1.5}$O$_4$ Cathodes and a Polymer Electrolyte," *Advanced Materials* 18:2597-2600 (Oct. 2006).
Asefa et al., "Periodic mesoporous organosilicas with organic groups inside the channel walls," *Nature* 402:867-871 (Dec. 1999).
Atkin et al., "Self-Assembly of a Nonionic Surfactant at the Graphite/Ionic Liquid Interface," *Journal of the American Chemical Society* 127:11940-11941 (Aug. 2005).
Attard et al., "Mesoporous Platinum Films from Lyotropic Liquid Crystalline Phases," *Science* 278:838-840 (Oct. 1997).
Bagshaw et al., "Templating of Mesoporous Molecular Sieves by Nonionic Polyethylene Oxide Surfactants," *Science* 269:1242-1244 (Sep. 1995).
Baudrin et al., "Structural evolution during the reaction of Li with nano-sized rutile type TiO2 at room temperature," *Electrochemistry Communications* 9:337-342 (Feb. 2007).
Berger et al., "Electronic Confinement and Coherence in Patterned Epitaxial Graphene," *Science* 312:1191-1196 (May 2006).
Bizdoaca et al., "Magnetically directed self-assembly of submicron spheres with a Fe$_3$O$_4$ nanoparticle shell," *Journal of Magnetism and Magnetic Materials*, 240(1-3):44-46 (Feb. 2002).
Bonard et al., "Purification and Size-Selection of Carbon Nanotubes," *Advanced Materials* 9(10):827-831 (month unknown 1997).
Braun et al., "Semiconducting superlattices template by molecular assemblies," *Nature* 380:325-328 (Mar. 1996).
Chen et al., "Mechanically Strong, Electrically Conductive, and Biocompatible Graphene Paper," Advanced Materials 20:3557-3561 (Jul. 2008).
Chen et al., "Reducing Carbon in LiFePO$_4$/C Composite Electrodes to Maximize Specific Energy, Volumetric Energy, and Tap Density," *Journal of the Electrochemical Society* 149(9):A1184-A1189 (Sep. 2002).
Choi et al., "Li-ion batteries from LiFePO$_4$ cathode and anatase/graphene composite anode for stationary energy storage," *Electrochemistry Communications* 12(3):378-381 (Jan. 2010).
Decher, "Fuzzy Nanoassemblies: Toward Layered Polymeric Multicomposites," Science 277(9):1232-1237 (Aug. 1997).
Dikin et al., "Preparation and characterization of graphene oxide paper," Nature 448:457-460 (Jul. 2007).
Dominko et al., "Impact of the Carbon Coating Thickness on the Electrochemical Performance of LiFePO$_4$/C Composites," *Journal of the Electrochemical Society*, 152(3):A607-A610 (Jan. 2005).
Erjavec et al., "RuO$_2$-wired high-rate nanoparticulate TiO$_2$ (anatase): Suppression of particle growth using silica," *Electrochemistry Communications*, 10:926-929 (Jun. 2008).
Franger et al., "Optimized Lithium Iron Phosphate for High-Rate Electrochemical Application," *Journal of the Electrochemical Society*, vol. 151, No. 7, pp. A1024-A1027 (May 2004).
Gòmez-Navarro et al., "Electronic Transport Properties of Individual Chemically Reduced Graphene Oxide Sheets," *Nano Letters*, 7(11):3499-3503 (Oct. 2007).
Goward et al., "Poly(pyrrole) and poly(thiophene)/vanadium oxide interleaved nanocomposites: positive electrodes for lithium batteries," *Electrochimica Acta* 43(10-11):1307-1313 (Apr. 1998).
Guo et al., "Superior Electrode Performance of Nanostructured Mesoporous TiO$_2$ (Anatase) through Efficient Hierarchical Mixed Conducting Networks," *Advanced Materials* 19:2087-2091 (Jul. 2007).
Hu et al., "High Lithium Electroactivity of Nanometer-Sized Rutile TiO$_2$," *Advanced Materials* 18:1421-1426 (Apr. 2006).
Hu et al., "Improved Electrode Performance of Porous LiFePO$_4$ Using RuO$_2$ as an Oxidic Nanoscale Interconnect," *Advanced Materials* 19:1963-1966 (Jul. 2007).
Huang et al., "Self-organizing high-density single-walled carbon nanotube arrays from surfactant suspensions," *Nanotechnology* 15:1450-1454 (Nov. 2004).
Huo et al., "Organization of Organic Molecules with Inorganic Molecular Species into Nanocomposite Biphase Arrays," *Chemistry Materials* 6:1176-1191 (Aug. 1994).
International Preliminary Report on Patentability and Written Opinion for PCT/US2009/004369 (mailed Feb. 10, 2011).

(56) References Cited

OTHER PUBLICATIONS

International Preliminary Report on Patentability and Written Opinion for PCT/US2009/005085 (mailed Mar. 24, 2011).
International Preliminary Report on Patentability and Written Opinion for PCT/US2010/045088 (mailed Feb. 23, 2012).
International Preliminary Report on Patentability and Written Opinion for PCT/US2010/045089 (mailed Feb. 23, 2012).
International Search Report and Written Opinion for PCT/US2009/004369 (mailed Jan. 29, 2010).
International Search Report for PCT/US2009/005085 (mailed Feb. 4, 2010).
International Search Report for PCT/US2010/045088 (mailed Oct. 6, 2010).
International Search Report for PCT/US2010/045089 (mailed Oct. 27, 2010).
International Search Report and Written Opinion for PCT/US2011/047144 (mailed Feb. 23, 2012).
International Search Report and Written Opinion for PCT/US2011/055216 (mailed Apr. 23, 2012).
International Search Report and Written Opinion for PCT/US2011/62016 (mailed Apr. 9, 2012).
Jiang et al., "Nanocrystalline Rutile $TiO_2$ Electrode for High-Capacity and High-Rate Lithium Storage," *Electrochemical and Solid-State Letters* 10(5):A127-A129 (Mar. 2007).
Kavan et al., "Nanocrystalline $TiO_2$ (Anatase) Electrodes: Surface Morphology, Adsorption, and Electrochemical Properties," *Journal of the Electrochemical Society* 143(2):394-400 (Feb. 1996).
Kresge et al., "Ordered mesoporous molecular sieves synthesized by a liquid-crystal template mechanism," *Nature* 359:710-712 (Oct. 1992).
Leroux et al., "Electrochemical Lithium Intercalation into a Polyaniline/$V_2O_5$ Nanocomposite," *J. Electrochemical Society* 143(9):L181-L183 (Sep. 1996).
Li et al., "Processable aqueous dispersions of grapheme nanosheets," *Nature Nanotechnology* 3:101-105 (Jan. 2008).
Lindsay, "Data analysis and anode materials for lithium ion batteries," PhD Thesis, University of Wollongong Thesis Collection, Ch. 2, Section 2.5.5, http://ro.uow.edu.au/theses/359 (2004).
Liu et al., "Oriented Nanostructures for Energy Conversion and Storage," *ChemSusChem*, 1:676-697 (Aug. 2008).
Lou et al., "Template-Free Synthesis of $SnO_2$ Hollow Nanostructures with High Lithium Storage Capacity," *Advanced Materials* 18:2325-2329 (Aug. 2006).
Maier et al., "Nanoionics: ion transport and electrochemical storage in confined systems," *Nature Materials* 4:805-815 (Nov. 2005).
Mao et al., "Structural, electronic and magnetic properties of manganese doping in the upper layer of bilayer graphene," *Nanotechnology* 19(20):205708-205715 (May 2008).
McAllister et al., "Single Sheet Functionalized Graphene by Oxidation and Thermal Expansion of Graphite," *Chemical Materials* 19:4396-4404 (May 2007).
Mdleleni et al., "Sonochemical Synthesis of Nanostructured Molybdenum Sulfide," *Journal of the American Chemical Society* 12:6189-6190 (Jun. 1998).
Moriguchi et al., "A Mesoporous Nanocomposite of $TiO_2$ and Carbon Nanotubes as a High-Rate LiIntercalation Electrode Material," *Advanced Materials* 18:69-73 (Jan. 2006).
Moskon et al., "Citrate-Derived Carbon Nanocoatings for Poorly Conducting Cathode," *Journal of the Electrochemical Society* 153(10):A1805-A1811 (Jul. 2006).
Nethravathi, et al., "Graphite Oxide-Intercalated Anionic Clay and Its Decomposition to Graphene-Inorganic Material Nanocomposites," *Langmuir* 24:8240-8244 (Aug. 2008).
Nishihara et al., "Carbon-coated mesoporous silica with hydrophobicity and electrical conductivity," *Carbon* 46(1):pp. 48-53 (Jan. 2008).
Niyogi et al., "Solution Properties of Graphite and Graphene," *Journal of the American Chemical Society* 128:7720-7721 (Jan. 2006).
Notice of Allowance from U.S. Patent and Trademark Office for U.S. Appl. No. 12/460,993, mailed Jul. 11, 2012.
Novoselov et al., "Electric Field Effect in Atomically Thin Carbon Films," *Science* 306:666-669 (Oct. 2004).
Office action from U.S. Patent and Trademark Office for U.S. Appl. No. 12/460,993, mailed Jan. 19, 2012.
Office action from U.S. Patent and Trademark Office for U.S. Appl. No. 12/462,857, mailed Jan. 10, 2012.
Office action from U.S. Patent and Trademark Office for U.S. Appl. No. 12/553,527, mailed Nov. 10, 2011.
Office action from U.S. Patent and Trademark Office for U.S. Appl. No. 12/553,527, mailed Jun. 1, 2012.
Office action from U.S. Patent and Trademark Office for U.S. Appl. No. 12/852,794, mailed Jan. 23, 2012.
Ou et al., "Characteristics of graphene-layer encapsulated nanoparticles fabricated using laser ablation method," *Diamond and Related Materials* 17(4-5):664-668 (Apr.-May 2008).
Paek et al., "Enhanced Cyclic Performance and Lithium Storage Capacity of $SnO_2$/Graphene Nanoporous Electrodes with Three-Dimensionally Delaminated Flexible Structure," *Nano Letters* 9(1):72-75 (Dec. 2008).
Peigney et al., "Specific surface area of carbon nanotubes and bundles of carbon nanotubes," *Carbon* 39:507-514 (Apr. 2001).
Prosini et al., "Improved electrochemical performance of a $LiFePO_4$-based composite cathode," *Electrochimica Acta* 46:3517-3523 (Aug. 2001).
Ramanathan et al., "Functionalized graphene sheets for polymer nanocomposites," *Nature Nanotechnology* 3:327-331 (May 2008).
Read et al., "$SnO_2$-carbon composites for lithium-ion battery anodes," *Journal of Power Sources* 96:277-281 (Jun. 2001).
Reddy et al., "Room temperature synthesis and Li insertion into nanocrystalline rutile $TiO_2$," *Electrochemistry Communications* 8:1299-1303 (Aug. 2006).
Restriction Requirement from the U.S. Patent and Trademark Office for U.S. Appl. No. 12/462,857, mailed Aug. 22, 2011.
Restriction Requirement from the U.S. Patent and Trademark Office for U.S. Appl. No. 12/553,527, mailed Sep. 26, 2011.
Richard et al., "Supramolecular Self-Assembly of Lipid Derivatives on Carbon Nanotubes," *Science* 300:775-778 (May 2003).
Ribeiro et al., "Assembly and Properties of Nanoparticles," *Nanostructure Science and Technology*, 33-79, see 62-63, 77 (2009).
Sakamoto et al., "Hierarchical battery electrodes based on inverted opal structures," Journal of Materials Communication 12:2859-2861 (Aug. 2002).
Schniepp et al., "Functionalized Single Graphene Sheets Derived from Splitting Graphite Oxide," *The Journal of Physical Chemistry Letters* 110:8535-8539 (Apr. 2006).
Schniepp et al., "Self-Healing of Surfactant Surface Micelles on Millisecond Time Scales," *Journal of the American Chemical Society* 128:12378-12379 (Aug. 2006).
Si, et al., "Synthesis of Water Soluble Graphene," *Nano Letters* 8(6):1679-1682 (May 2008).
Srinivas, et al., "Molecular Dynamics Simulations of Surfactant Self-Organization at a Solid—Liquid Interface," *Journal of the American Chemical Society* 128(3):848-853 (Jan. 2006).
Stankovich et al., "Graphene-based composite materials," Nature 442:282-286 (Jul. 2006).
Stankovich et al., "Stable aqueous dispersions of graphitic nanoplatelets via the reduction of exfoliated graphite oxide in the presence of poly(sodium 4-styrenesulfonate)," *Journal of Materials Chemistry* 16:155-158 (document marked Nov. 2005).
Stoller et al., "Graphene-Based Ultracapacitors," *Nano Letters* 8(10):3498-3502 (Sep. 2008).
Superior Graphite Company, "Development of Low cost Carbonaceous Materials for Anodes in Lithium-Ion Batteries for Electric and Hybrid Electric Vehicles," DE-F02-00EE50630, 50 pages (Dec. 10, 2002).
Suslick et al., "Sonochemical synthesis of amorphous iron," *Nature* 353:414-416 (Oct. 1991).
Suzuki et al., "$H$-$T$ phase diagram and the nature of vortex-glass phase in a quasi-two-dimensional superconductor: Sn-metal layer sandwiched between graphene sheets," *Physica C: Superconductivity* 402(3):243-256 (Nov. 2003).

(56) References Cited

OTHER PUBLICATIONS

Tanaka et al., "Characteristics of graphene-layer encapsulated nanoparticles fabricated using laser ablation method," *Diamond and Related Materials* 17(4-5):664-668 (Nov. 2007).
Tarascon et al., "Issues and challenges facing rechargeable lithium batteries," *Nature* 414:359-367 (Nov. 2001).
Tung et al., "Low-temperature solution processing of graphene-carbon nanotube hybrid materials for high-performance transparent conductors," *Nano Lett.*, 9(5):1949-1955 (Apr. 2009).
U.S. Appl. No. 12/980,328, filed Dec. 28, 2010.
Wang, et al., "Atomic Layer Deposition of Metal Oxides on Pristine and Functionalized Graphene," *Journal of the American Chemical Society* 130:8152-8153 (Jun. 2008).
Wang, et al., "Cooperative Self-Assembly of Tertiary Systems: Novel Graphene-Metal Oxide Nanocomposites," Pacific Northwest National Laboratory and Princeton University 21 pages (date unknown).
Wang et al., "Microemulsion Syntheses of Sn and $SnO_2$-Graphite Nanocomposite Anodes for Li-Ion Batteries," *Journal of the Electrochemical Society*, 151(4):A563-A570 (Feb. 20, 2004).
Wang et al., "Self-Assembled TiO-Graphene Hybrid Nanostructures for Enhanced Li-Ion Insertion," *ACS Nano*, 3(4):907-914 (Mar. 26, 2009).
Wang, et al., "Surface-Mediated Growth of Transparent, Oriented, and Well-Defined Nanocrystalline Anatase Titania Films," *Journal of the American Chemical Society* 128:13670-13671 (Oct. 2006).
Wang, et al., "Synthesis and Li-Ion Insertion Properties of Highly Crystalline Mesoporous Rutile TiO2," *Chem. Mater.*, 20:3435-3442 (May 2008).
Wang et al., "Tin Nanoparticle Loaded Graphite Anodes for Li-Ion Battery Applications," *Journal of the Electrochemical Society*, vol. 151, No. 11, pp. A563-A570 (Oct. 4, 2004).
Watcharotone et al., "Graphene-Silica Composite Thin Films as Transparent Conductors," *Nano Letters* 7(7)1888-1892 (Jun. 2007).
Whitesides, et al., "Molecular Self-Assembly and Nanochemistry: A Chemical Strategy for the Synthesis of Nanostructures," *Science* 254:1312-1319 (Nov. 1991).
Williams, et al., "$TiO_2$-Graphene Nanocomposites. UV-Assisted Photocatalytic Reduction of Graphene Oxide," *Acs Nano* 2(7):1487-1491 (Jul. 2008).
Xu et al., "Assembly of chemically modified graphene: methods and applications," *J. Mater. Chem.*, 21:3311-3323 (Mar. 2011).
Xu, et al., "Flexible Graphene Films via the Filtration of Water-Soluble Noncovalent Functionalized Graphene Sheets," Journal of the American Chemical Society 130:5856-5857 (Apr. 2008).
Yamabi, et al., "Crystal Phase Control for Titanium Dioxide Films by Direct Deposition in Aqueous Solutions," *Chemical Materials* 14:609-614 (Jan. 2002).
Yang, et al., "Generalized syntheses of large-pore mesoporous metal oxides with semicrystalline frameworks," *Nature* 396:152-155 (Nov. 1998).
Yoo, et al., "Large Reversible Li Storage of Graphene Nanosheet Families for Use in Rechargeable Lithium Ion Batteries," *Nano Letters* 8(8):2277-2282 (Aug. 2008).
Zhao et al., "Triblock Copolymer Syntheses of Mesoporous Silica with Periodic 50 to 300 Angstrom Pores," *Science* 279:548-552 (Jan. 1998).
Zhou et al., "Lithium Insertion into $TiO_2$ Nanotube Prepared by the Hydrothermal Process," *Journal of the Electrochemical Society* 150(9):A1246-A1249 (Jul. 2003).
Zukalová et al., "Pseudocapacitive Lithium Storage in $TiO_2(B)$," *Chemistry of Materials* 17:1248-1255 (Feb. 2005).
Final Office action from U.S. Patent and Trademark Office for U.S. Appl. No. 12/462,857, mailed Aug. 23, 2012.
Final Office action from U.S. Patent and Trademark Office for U.S. Appl. No. 12/553,527, mailed Nov. 20, 2012.
Final Office action from U.S. Patent and Trademark Office for U.S. Appl. No. 12/852,794, mailed Jul. 3, 2012.
Final Office action from U.S. Patent and Trademark Office for U.S. Appl. No. 13/585,741, mailed May 23, 2013.
Herle et al., "Nano-network electronic conduction in iron and nickel olivine phosphates," *Nature Materials*, 3:147-152 (Feb. 2004).
McDermott et al., "Electron Transfer Kinetics of Aquated $Fe^{+3/+2}$, $Eu^{+3/+2}$, and $V^{+3/+2}$ at Carbon Electrodes," *Journal of the Electrochemical Society*, 140(9):2593-2599 (Sep. 1993).
Mockensturm et al., "Van Der Waals' Elastica," *2005 ASME International Mechanical Engineering Congress and Exposition*, 277-291 (Nov. 5-11, 2005).
Nakahara et al., "Structural changes of a pyrolytic graphite surface oxidized by electrochemical and plasma treatment," *Journal of Materials Science*, 29(12):3193-3199 (Jun. 1994).
Notice of Allowance from U.S. Patent and Trademark Office for U.S. Appl. No. 12/901,526, mailed Apr. 15, 2013.
Office action from the Chinese Patent Office for Chinese Patent Application No. 200980129673.4, mailed Sep. 10, 2012.
Office action from the Chinese Patent Office for Chinese Patent Application No. 200980129673.4, mailed Mar. 7, 2013.
Office action from the Chinese Patent Office for Chinese Patent Application No. 200980135205.8, mailed Nov. 14, 2012.
Office action from U.S. Patent and Trademark Office for U.S. Appl. No. 12/901,526, mailed Dec. 3, 2012.
Office action from U.S. Patent and Trademark Office for U.S. Appl. No. 12/901,527, mailed Apr. 8, 2013.
Office action from U.S. Patent and Trademark Office for U.S. Appl. No. 12/980,328, mailed Feb. 27, 2013.
Office action from U.S. Patent and Trademark Office for U.S. Appl. No. 13/585,741, mailed Jan. 14, 2013.
Restriction Requirement from the U.S. Patent and Trademark Office for U.S. Appl. No. 12/901,527, mailed Dec. 13, 2012.
Shao, "Influencing Surface Tension," *California State Science Fair 2006 Project Summary Project* No. J0531 http://www.usc.edu/CSSF/History/2006/Projects/J0531.pdf (Apr. 2006).
Slack, "Thermal Conductivity of Pure and Impure Silicon, Silicon Carbide, and Diamond," *Journal of Applied Physics*, 35(12):3460-3466 (Dec. 1964).
The Free Dictionary (Collins English Dictionary Entry) http://www.thefreedictionary.com/p/slurry (printed Apr. 15, 2015).
Walker, *Just the Facts 101 Textbook Key Facts, Physics*, vol. 1, Chapter 15 Fluids, p. 13 http://books.google.com/books?id=fhRX6IFg2fcC&pg=PT278Ipg=PT278&dq=%22Surfactants+are+compounds+that+lower+the+surface+tension+of+a+liquid%22+-2012+-2011+-2010+-2009&source=bl&ots=cVS1AJ-GOS&sig=e9wgCJkhGYTe2zdqoql1y-iQG1o&hl=en&sa=X&ei=-6ErUO6NO6Wo0AGh74D4Bw&ved=0CEUQ6AEwBA#v=onepage&q=%22Surfactants%20are%20compounds%20that%20lower%20the-%20surface%20tension%20of%20a%20liquid%22%20-20-2012%20-2011%20/2010%20-2009&f=false.
Wang et al., "Low-Temperature Synthesis of Tunable Mesoporous Crystalline Transition Metal Oxides and Applications as Au Catalyst Supports," *Chemistry of Materials*, 20:13499-13509 (Aug. 2008).
Yao et al., "In situ chemical synthesis of $SnO_2$-graphene nanocomposite as anode materials for lithium-ion batteries," *Electrochemistry Communications*, 11:1849-1852 (Aug. 2009).
Yu et al., "Mesoporous tin oxides as lithium intercalation anode materials," *Journal of Power Sources*, 104:97-100 (Jan. 2002).

\* cited by examiner

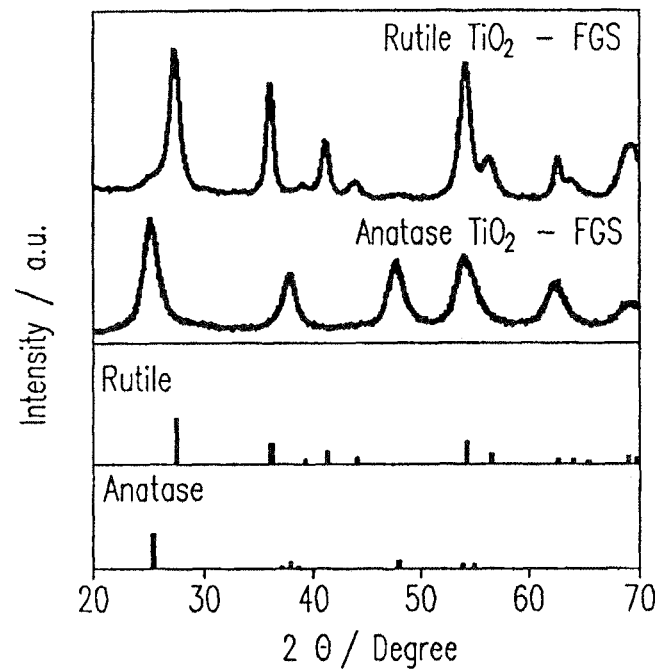
Fig. 5
 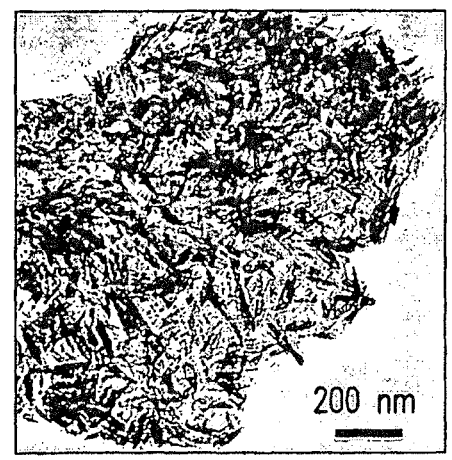
Fig. 6a          Fig. 6b

NANOCOMPOSITE OF GRAPHENE AND METAL OXIDE MATERIALS

CROSS REFERENCE TO RELATED APPLICATIONS

This is a Divisional of U.S. patent application Ser. No. 12/460,993, filed Jul. 27, 2009 now U.S. Pat. No. 8,257,867, which claims the benefit of U.S. Provisional Patent Application No. 61/084,140, filed Jul. 28, 2008, entitled Metal Oxide-Graphene Hybrid Nanostructures and Method of Making, both of which are hereby incorporated by reference.

The invention was made with Government support under Contract DE-AC0676RLO 1830, awarded by the U.S. Department of Energy. The Government has certain rights in the invention.

TECHNICAL FIELD

This invention relates to nanocomposite materials of graphene bonded to metal oxides and methods for forming nanocomposite materials of graphene bonded to metal oxides.

BACKGROUND OF THE INVENTION

Graphene is generally described as a one-atom-thick planar sheet of sp2-bonded carbon atoms that are densely packed in a honeycomb crystal lattice. The carbon-carbon bond length in graphene is approximately 0.142 nm. Graphene is the basic structural element of some carbon allotropes including graphite, carbon nanotubes and fullerenes. Graphene exhibits unique properties, such as very high strength and very high conductivity. Those having ordinary skill in the art recognize that many types of materials and devices may be improved if graphene is successfully incorporated into those materials and devices, thereby allowing them to take advantage of graphene's unique properties. Thus, those having ordinary skill in the art recognize the need for new methods of fabricating graphene and composite materials that incorporated graphene.

Graphene has been produced by a variety of techniques. For example, graphene is produced by the chemical reduction of graphene oxide, as shown in Gomez-Navarro, C.; Weitz, R. T.; Bittner, A. M.; Scolari, M.; Mews, A.; Burghard, M.; Kern, K. Electronic Transport Properties of Individual Chemically Reduced Graphene Oxide Sheets and *Nano Lett.* 2007, 7, 3499-3503 Si, Y.; Samulski, E. T. Synthesis of Water Soluble Graphene. *Nano Lett.* 2008, 8, 1679-1662.

While the resultant product shown in the forgoing methods is generally described as graphene, it is clear from the specific capacity of these materials that complete reduction is not achieved, because the resultant materials do not approach the theoretical specific capacity of neat graphene. Accordingly, at least a portion of the graphene is not reduced, and the resultant material contains at least some graphene oxide. As used herein, the term "graphene" should be understood to encompass materials such as these, that contain both graphene and small amounts of graphene oxide.

For example, functionalized graphene sheets (FGSs) prepared through the thermal expansion of graphite oxide as shown in McAllister, M. J.; LiO, J. L.; Adamson, D. H.; Schniepp, H. C.; Abdala, A. A.; Liu, J.; Herrera-Alonso, M.; Milius, D. L.; CarO, R.; Prud'homme, R. K.; Aksay, I. A. Single Sheet Functionalized Graphene by Oxidation and Thermal Expansion of Graphite. *Chem. Mater.* 2007, 19, 4396-4404 and Schniepp, H. C.; Li, J. L.; McAllister, M. J.; Sai, H.; Herrera-Alonso, M.; Adamson, D. H.; Prud'homme, R. K.; Car, R.; Saville, D. A.; Aksay, I. A. Functionalized Single Graphene Sheets Derived from Splitting Graphite Oxide. *J. Phys. Chem. B* 2006, 110, 8535-8539 have been shown to have tunable C/O ratios ranging from 15 to 500. The term "graphene" as used herein should be understood to include both pure graphene and graphene with small amounts of graphene oxide, as is the case with these materials.

Further, while graphene is generally described as a one-atom-thick planar sheet densely packed in a honeycomb crystal lattice, these one-atom-thick planar sheets are typically produced as part of an amalgamation of materials, often including materials with defects in the crystal lattice. For example, pentagonal and heptagonal cells constitute defects. If an isolated pentagonal cell is present, then the plane warps into a cone shape. Likewise, an isolated heptagon causes the sheet to become saddle-shaped. When producing graphene by known methods, these and other defects are typically present.

The IUPAC compendium of technology states: "previously, descriptions such as graphite layers, carbon layers, or carbon sheets have been used for the term graphene . . . it is not correct to use for a single layer a term which includes the term graphite, which would imply a three-dimensional structure. The term graphene should be used only when the reactions, structural relations or other properties of individual layers are discussed". Accordingly, while it should be understood that while the terms "graphene" and "graphene layer" as used in the present invention refers only to materials that contain at least some individual layers of single layer sheets, the terms "graphene" and "graphene layer" as used herein should therefore be understood to also include materials where these single layer sheets are present as a part of materials that may additionally include graphite layers, carbon layers, and carbon sheets.

The unique electrical and mechanical properties of graphene have led to interest in its use in a variety of applications. For example, electrochemical energy storage has received great attention for potential applications in electric vehicles and renewable energy systems from intermittent wind and solar sources. Currently, Li-ion batteries are being considered as the leading candidates for hybrid, plug-in hybrid and all electrical vehicles, and possibly for utility applications as well. However, many potential electrode materials (e.g., oxide materials) in Li-ion batteries are limited by slow Li-ion diffusion, poor electron transport in electrodes, and increased resistance at the interface of electrode/electrolyte at high charging-discharging rates.

To improve the charge-discharge rate performance of Li-ion batteries, extensive work has focused on improving Li-ion and/or electron transport in electrodes. The use of nanostructures (e.g., nanoscale size or nanoporous structures) has been widely investigated to improve the Li-ion transport in electrodes by shortening Li-ion insertion/extraction pathway. In addition, a variety of approaches have also been developed to increase electron transport in the electrode materials, such as conductive coating (e.g., carbon), and uses of conductive additives (e.g., conductive oxide wires or networks, and conductive polymers). Recently, $TiO_2$ has been extensively studied to demonstrate the effectiveness of nanostructures and conductive coating in these devices.

$TiO_2$ is particularly interesting because it is an abundant, low cost, and environmentally benign material. $TiO_2$ is also structurally stable during Li-insertion/extraction and is intrinsically safe by avoiding Li electrochemical deposition. These properties make $TiO_2$ particularly attractive for large scale energy storage.

Another way to improve the Li-ion insertion properties is to introduce hybrid nanostructured electrodes that interconnect nanostructured electrode materials with conductive additive nanophases. For example, hybrid nanostructures, e.g., $V_2O_5$—carbon nanotube (CNT) or anatase $TiO_2$—CNT hybrids, $LiFePO_4$—$RuO_2$ nanocomposite, and anatase $TiO_2$—$RuO_2$ nanocomposite, combined with conventional carbon additives (e.g., Super P carbon or acetylene black) have demonstrated an increased Li-ion insertion/extraction capacity in the hybrid electrodes at high charge/discharge rates.

While the hybrids or nanocomposites offer significant advantages, some of the candidate materials to improve the specific capacity, such as $RuO_2$ and CNTs, are inherently expensive. In addition, conventional carbon additives at high loading content (e.g., 20 wt % or more) are still needed to ensure good electron transport in fabricated electrodes. To improve high-rate performance and reduce cost of the electrochemically active materials, it is important to identify high surface area, inexpensive and highly conductive nanostructured materials that can be integrated with electrochemical active materials at nanoscale.

Those having ordinary skill in the art recognize that graphene may be the ideal conductive additive for applications such as these hybrid nanostructured electrodes because of its high surface area (theoretical value of 2630 $m^2/g$), which promises improved interfacial contact, the potential for low manufacturing cost as compared to CNTs, and high specific capacity. Recently, high-surface-area graphene sheets were studied for direct Li-ion storage by expanding the layer spacing between the graphene sheets as described in Yoo, E.; Kim, J.; Hosono, E.; Zhou, H.-s.; Kudo, T.; Honma, I. Large Reversible Li Storage of Graphene Nanosheet Families for Use in Rechargeable Lithium Ion Batteries. *Nano Lett.* 2008, 8, 2277-2282. In addition to these studies, graphene has also been used to form composite materials with $SnO_2$ for improving capacity and cyclic stability of the anode materials as described in Paek, S.-M.; Yoo, E.; Honma, I. Enhanced Cyclic Performance and Lithium Storage Capacity of $SnO_2$/Graphene Nanoporous Electrodes with Three-Dimensionally Delaminated Flexible Structure. *Nano Lett.* 2009, 9, 72-75.

While these results were promising, they fell short of producing materials exhibiting specific capacity approaching the theoretical possibilities. For example, while it has been shown that graphene may be combined with certain metal oxides, the graphene materials in these studies fall far short of the theoretical maximum conductivity of single-sheet graphene. Further, those having ordinary skill in the art recognize that the carbon:oxygen ratio and the specific surface area of graphene provide an excellent proxy to measure the relative abundance of high conductivity single-sheets in a given sample. This is because the C:O ratio is a good measure of the degree of "surface functionalization" which affects conductivity, and the surface area conveys the percentage of single-sheet graphene in the synthesized powder.

Accordingly, those having ordinary skill in the art recognize that improvements to these methods are required to achieve the potential of using graphene nanostructures in these and other applications. Specifically, those skilled in the art recognize the need for new methods that produce nanocomposite materials of graphene and metal oxides that exhibit greater specific capacity than demonstrated in these prior art methods.

The present invention fulfills that need, and provides such improved composite nanostructures of graphene layers and metal oxides that exhibit specific capacities heretofore unknown in the prior art. The present invention further provides improved and novel methods for forming these composite nanostructures, and improved and novel devices that take advantage of the new and unique properties exhibited by these materials. The present invention meets these objectives by making nanostructures of graphene layers and metal oxides where the C:O ratio of the graphene layers in these nanostructures is between 15-500:1, and preferably 20-500:1, and the surface area of the graphene layers in these nanostructures is 400-2630 m2/g, and preferably 600-2630 m2/g, as measured by BET nitrogen adsorption at 77K. While those having ordinary skill in the art have recognized the desirability of having C:O ratios and surface areas this high in the graphene of nanostructures of graphene and metal oxides, the prior art methods have failed to produce them.

SUMMARY OF THE INVENTION

The present invention thus includes a nanocomposite material comprising a metal oxide bonded to at least one graphene layer. The metal oxide is preferably $M_xO_y$, and where M is selected from the group consisting of Ti, Sn, Ni, Mn, V, Si, Co and combinations thereof. The nanocomposite materials of the present invention are readily distinguished from the prior art because they exhibit a specific capacity of at least twice that of the metal oxide material without the graphene at a charge/discharge rate greater than about 10 C.

For example, while not meant to be limiting, an example where titania is used as the metal oxide, the resulting nanocomposite material has a specific capacity at least twice that of a titania material without graphene at a charge/discharge rate greater than about 10 C. Continuing the example, where titania is used as the metal oxide, the titania may be provided in a mesoporous form, and the mesoporous titania may further be provided in a rutile crystalline structure, or in an anatase crystalline structure.

The nanocomposite material of the present invention preferably is provided as graphene layers with metal oxides uniformly distributed throughout the nanoarchitecture of the layers. Preferably, but not meant to be limiting, the nanocomposite material of the present invention provides a metal oxide bonded to at least one graphene layer that has a thickness between 0.5 and 50 nm. More preferably, but also not meant to be liming, the nanocomposite material of the present invention provides a metal oxide bonded to at least one graphene layer that has a thickness between 2 and 10 nm. Preferably, the carbon to oxygen ratio (C:O) of the graphene in the nanostructures of the present invention is between 15-500:1, and more preferably between 20-500:1. Preferably, the surface area of the graphene in the nanostructures of the present invention is between 400-2630 m2/g, and more preferably between 600-2630 m2/g, as measured by BET nitrogen adsorption at 77K.

Another aspect of the present invention is a method for forming the nanocomposite materials of graphene bonded to metal oxide. The method consists of the steps of providing graphene in a first suspension; dispersing the graphene with a surfactant; adding a metal oxide precursor to the dispersed graphene to form a second suspension; and precipitating the metal oxide from the second suspension onto at least one surface of the dispersed graphene. In this manner, a nanocomposite material of at least one metal oxide bonded to at least one graphene layer is thereby formed. The nanocomposite materials formed in this manner are readily distinguished from materials formed by prior art methods because they exhibit a specific capacity of at least twice that of the metal oxide material without the graphene at a charge/discharge rate greater than about 10 C.

Preferably, but not meant to be limiting, the first suspension is, at least in part, an aqueous suspension and the surfactant is an anionic surfactant. Also not meant to be limiting, a preferred anionic sulfate surfactant is sodium dodecyl sulfate. The method of the present invention may further comprise the step of heating the second suspension from 50 to 500 degrees C. to condense the metal oxide on the graphene surface. The method of the present invention may also further comprise the step of heating the second suspension from 50 to 500 degrees C. to remove the surfactant.

The present invention also encompasses an energy storage device comprising a nanocomposite material having an active metal oxide compound and one graphene layer arranged in a nanoarchitecture. The energy storage devices of the present invention are readily distinguished from prior art energy storage devices because they exhibit a specific capacity of at least twice that of the metal oxide material without the graphene at a charge/discharge rate greater than about 10 C.

For example, while not meant to be limiting, an example where titania is used as the metal oxide, the energy storage device of the present invention has a specific capacity at least twice that of a titania material without graphene at a charge/discharge rate greater than about 10 C.

Preferably, but not meant to be limiting, the energy storage device of the present invention is provided as having at least one component having a nanocomposite material having graphene layers with metal oxides uniformly distributed throughout the nanoarchitecture of the layers. Also preferably, but not meant to be limiting, the energy storage device of the present invention is an electrochemical device having an anode, a cathode, an electrolyte, and a current collector, wherein at least one of the anode, cathode, electrolyte, and current collector is fabricated, at least in part, from a nanocomposite material having graphene layers with metal oxides uniformly distributed throughout the nanoarchitecture of the layers.

In embodiments where the energy storage device of the present invention includes a cathode fabricated, at least in part, from a nanocomposite material having graphene layers with metal oxides uniformly distributed throughout the nanoarchitecture of the layers, the graphene in the cathode is preferably, but not meant to be limiting, 5% or less of the total weight of the cathode, and more preferably, but also not meant to be limiting, 2.5% or less of the total weight of the cathode. In this manner, the energy storage devices of the present invention are distinguished from prior art devices which are characterized by having more than 5% of the total weight of the cathode as carbon with no graphene.

In embodiments where the energy storage device of the present invention includes an anode fabricated, at least in part, from a nanocomposite material having graphene layers with metal oxides uniformly distributed throughout the nanoarchitecture of the layers, the graphene in the anode is preferably, but not meant to be limiting, 10% or less of the total weight of anode, and more preferably, but also not meant to be limiting, 5% or less of the total weight of anode. In this manner, the energy storage devices of the present invention are distinguished from prior art devices which are characterized by having more than 10% of the total weight of the anode as carbon with no graphene.

One embodiment where the present invention is an energy storage device is as a lithium ion battery. In this embodiment, the lithium ion battery has at least one electrode with at least one graphene layer bonded to titania to form a nanocomposite material, and the nanocomposite material has a specific capacity at least twice that of a titania material without graphene at a charge/discharge rate greater than about 10 C.

The electrode of this lithium ion battery may further have multiple nanocomposite material layers uniformly distributed throughout the electrode.

BRIEF DESCRIPTION OF THE DRAWINGS

The following detailed description of the embodiments of the invention will be more readily understood when taken in conjunction with the following drawing, wherein:

FIG. 5 is an XRD pattern of one embodiment of the present invention, an anatase $TiO_2$—FGS and rutile $TiO_2$—FGS hybrid material. Standard diffraction peaks of anatase $TiO_2$ (JCPDS No. 21-1272) and rutile $TiO_2$ (JCPDS No. 21-1276) are shown as vertical bars.

FIG. 6(a)-(g) are TEM and SEM images of the nanocomposite materials of various embodiments of the present invention at selected magnifications.

FIG. 7(a) shows the voltage profiles for control rutile $TiO_2$ and rutile $TiO_2$—FGS (0.5 wt % FGS) hybrid nanostructures at C/5 charge-discharge rates. FIG. 7(b) shows the specific capacity of control rutile $TiO_2$ and the rutile $TiO_2$—FGS hybrids at different charge/discharge rates; FIG. 7(c) shows the cycling performance of the rutile $TiO_2$—FGS up to 100 cycles at 1 C charge/discharge rates after testing at various rates shown in FIG. 7(b). FIG. 7(d) shows the voltage profiles for control anatase $TiO_2$ and anatase $TiO_2$—FGS (2.5 wt % FGS) hybrid nanostructures at C/5 charge-discharge rates. FIG. 7(e) shows the specific capacity of control anatase $TiO_2$ and the anatase $TiO_2$—FGS hybrids at different charge/discharge rates; FIG. 7(f) shows the cycling performance of the anatase $TiO_2$—FGS up to 100 cycles at 1 C charge/discharge rates after testing at various rates shown in FIG. 7(e).

DETAILED DESCRIPTION OF THE PREFERRED EMBODIMENTS

Figure 1:
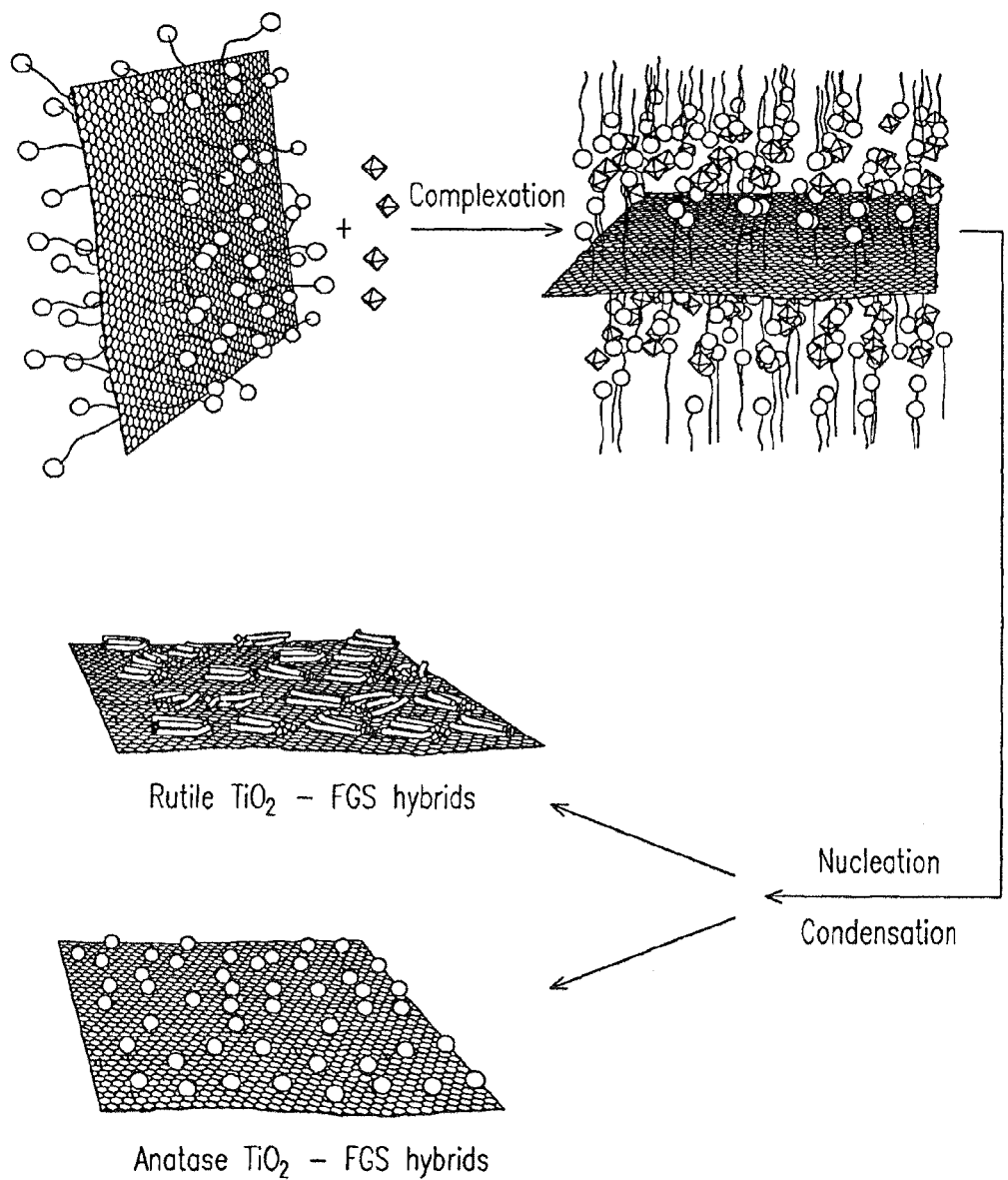
FIG. 1 is a schematic illustration of the present invention showing anionic sulfate surfactant mediated stabilization of graphene and growth of $TiO_2$—FGS hybrid nanostructures.

For the purposes of promoting an understanding of the principles of the invention, reference will now be made to the embodiments illustrated in the drawings and specific language will be used to describe the same. It will nevertheless be understood that no limitations of the inventive scope is thereby intended, as the scope of this invention should be evaluated with reference to the claims appended hereto. Alterations and further modifications in the illustrated devices, and such further applications of the principles of the invention as illustrated herein are contemplated as would normally occur to one skilled in the art to which the invention relates.

A series of experiments were conducted to demonstrate certain embodiments of the present invention. In these experiments, anionic sulfate surfactants were used to assist the stabilization of graphene in aqueous solutions and facilitate the self-assembly of in-situ grown nanocrystalline TiO$_2$, rutile and anatase, with graphene. These nanostructured TiO$_2$-graphene hybrid materials were then used for investigation of Li-ion insertion properties. The hybrid materials showed significantly enhanced Li-ion insertion/extraction in TiO$_2$. The specific capacity was more than doubled at high charge rates, as compared with the pure TiO$_2$ phase. The improved capacity at high charge-discharge rate may be attributed to increased electrode conductivity in the presence of a percolated graphene network embedded into the metal oxide electrodes. While not to be limiting, these are among the features that distinguish the methods, materials, and devices of the present invention from the prior art.

These experiments thereby demonstrated that the use of graphene as a conductive additive in self-assembled hybrid nanostructures enhances high rate performance of electrochemical active materials. While the metal oxide TiO$_2$ was selected as a model electrochemical active oxide material, the method of the present invention is equally applicable to all metal oxides.

These experiments utilized a one-step synthesis approach to prepare metal oxide-graphene hybrid nanostructures. In these experiments, the reduced and highly conductive form of graphene is hydrophobic and oxides are hydrophilic. The present invention's use of surfactants not only solved the hydrophobic/hydrophilic incompatibility problem, but also provides a molecular template for controlled nucleation and growth of the nanostructured inorganics, resulting in a uniform coating of the metal oxide on the graphene surfaces.

This approach, schematically illustrated in FIG. 1, starts with the dispersion of the graphene layers with an anionic sulfate surfactant. For example, but not meant to be limiting, sodium dodecyl sulfate. The method then proceeds with the self-assembly of surfactants with the metal oxide precursor and the in-situ precipitation of metal oxide precursors to produce the desired oxide phase and morphology.

In a typical preparation of rutile TiO$_2$—FGS hybrid materials (e.g., 0.5 wt % FGS), 2.4 mg FGSs and 3 mL SDS aqueous solution (0.5 mol/L) were mixed together. The mixture was diluted to 15 mL and sonicated for 10-15 min using a BRANSON SONIFER S-450A, 400W. 25 mL TiCl$_3$ (0.12 mol/L) aqueous solution was then added into as-prepared SDS-FGS dispersions while stirring. Then, 2.5 mL H$_2$O$_2$ (1 wt %) was added dropwise followed by de-ionized water under vigorous stirring until reaching a total volume of 80 mL. In a similar manner, 0.8, 26.4, and 60 mg FGSs were used to prepare the hybrid materials with 0.17, 5, and 10 wt % FGS, respectively.

Rutile TiO$_2$—CNT (0.5 wt % carbon nanotubes) hybrid materials were also prepared using corresponding single-wall CNTs (2.4 mg) according to the above method.

In a typical preparation of anatase TiO$_2$—FGS hybrid materials (e.g., 2.5 wt % FGS), 13 mg FGS and 0.6 mL SDS aqueous solution (0.5 mol/L) were mixed and sonicated to prepare an SDS-FGS dispersion. 25 mL TiCl$_3$ (0.12 mol/L) aqueous solution was added into as-prepared SDS-FGS dispersions while stirring followed by the addition of 5 mL 0.6 M Na$_2$SO$_4$. 2.5 mL H$_2$O$_2$ (1 wt %) was then added dropwise followed by addition of de-ionized water under vigorous stirring until reaching a total volume of 80 mL.

All of these resulting mixtures were further stirred in a sealed polypropylene flask at 90° C. for 16 h. The precipitates were separated by centrifuge followed by washing with de-ionized water and ethanol. The centrifuging and washing processes were repeated 3 times. The product was then dried in a vacuum oven at 70° C. overnight and subsequently calcined in static air at 400° C. for 2 h.

The thermal gravimetric analysis (TGA) indicated approximately 50 wt % percentage loss of FGSs during calcination in air at 400° C. for 2 h. The weight percentage of the graphene in the hybrid materials was thus correspondingly normalized, which is consistent with TGA of the hybrid materials.

The samples were characterized by XRD patterns obtained on a Philips Xpert X-ray diffractometer using Cu K$_\alpha$ radiation at $\lambda$=1.54 Å. The TEM imaging was performed on a JEOL JSM-2010 TEM operated at 200 kV. SEM images were obtained on an FEI Helios Nanolab dual-beam focused ion beam/scanning electron microscope (FIB/SEM) operated at 2 kV. XPS characterization was performed using a Physical Electronics Quantum 2000 Scanning ESCA Microprobe with a focused monochromatic Al K$_\alpha$ X-ray (1486.7 eV) source and a spherical section analyzer. Electrochemical experiments were performed with coin cells (Type 2335, half-cell) using Li foil as counter electrode. The working electrode was prepared using the mixture of calcined TiO$_2$—FGS or control TiO$_2$, Super P and poly (vinylidene fluoride) (PVDF) binder dispersed in N-methylpyrrolidone (NMP) solution. For the preparation of rutile TiO$_2$ electrode (less than 5 wt % graphene), the mass ratio of rutile TiO$_2$-hybrid or control rutile TiO$_2$, Super P and PVDF was 80:10:10. For the preparation of anatase TiO$_2$ electrode, the mass ratio was 70:20:10 and 80:10:10 for control anatase TiO$_2$ and anatase TiO$_2$—FGS hybrid (2.5 wt % FGS), respectively.

Rutile TiO$_2$—FGS hybrid (10 wt % FGS) electrode was prepared with a mass ratio of hybrid and PVDF binder at 90:10 without Super P. The resultant slurry was then uniformly coated on an aluminum foil current collector and dried overnight in air. The electrolyte used was 1 M LiPF$_6$ dissolved in a mixture of ethyl carbonate (EC) and dimethyl carbonate (DMC) with the volume ratio of 1:1. The coin cells were assembled in an argon-filled glove box. The electrochemical performance of TiO$_2$-graphene was characterized with an Arbin Battery Testing System at room temperature. The electrochemical tests were performed between 3~1 V vs. Li$^+$/Li and C-rate currents applied were calculated based on a rutile TiO$_2$ theoretical capacity of 168 mAh/g.

Functionalized graphene sheets (FGSs) used in this study were prepared through the thermal expansion of graphite oxide according to the method shown in McAllister, M. J.;

LiO, J. L.; Adamson, D. H.; Schniepp, H. C.; Abdala, A. A.; Liu, J.; Herrera-Alonso, M.; Milius, D. L.; CarO, R.; Prud'homme, R. K.; Aksay, I. A. Single Sheet Functionalized Graphene by Oxidation and Thermal Expansion of Graphite. *Chem. Mater.* 2007, 19, 4396-4404 and Schniepp, H. C.; Li, J. L.; McAllister, M. J.; Sal, H.; Herrera-Alonso, M.; Adamson, D. H.; Prud'homme, R. K.; Car, R.; Saville, D. A.; Aksay, I. A. Functionalized Single Graphene Sheets Derived from Splitting Graphite Oxide. *J. Phys. Chem. B* 2006, 110, 8535-8539. As discussed previously, in comparison to the graphene produced by the chemical reduction of graphene oxide, graphene prepared by the thermal expansion approach can have tunable C/O ratios ranging from 15 to 500 and thus its conductivity can be tuned to higher values.

Figure 2:
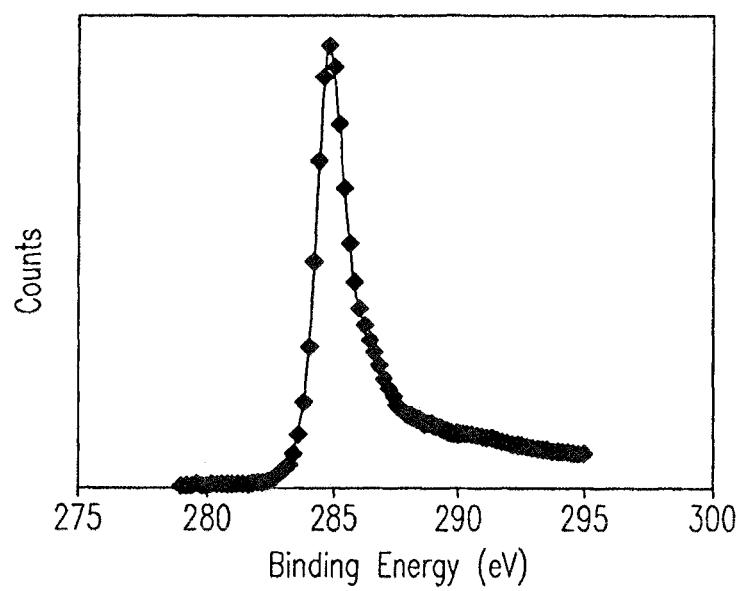
FIG. 2 is a graph showing high energy resolution photoemission spectra of the C 1s region in functionalized graphene sheets (FGS) used in one embodiment of the present invention.

FGSs processing starts with chemical oxidation of graphite flakes to increase the c-axis spacing from 0.34 to 0.7 nm. The resultant graphite oxide is then split by a rapid thermal expansion to yield separated graphene sheets. X-ray photoemission spectroscopy (XPS) of FGSs shows a sharp C1s peak indicating good $sp^2$ conjugation as shown in FIG. 2. A small shoulder at 286 eV indicates the existence of some C—O bonds corresponding to the epoxy and hydroxyl functional groups on FGSs.

Figure 4A:
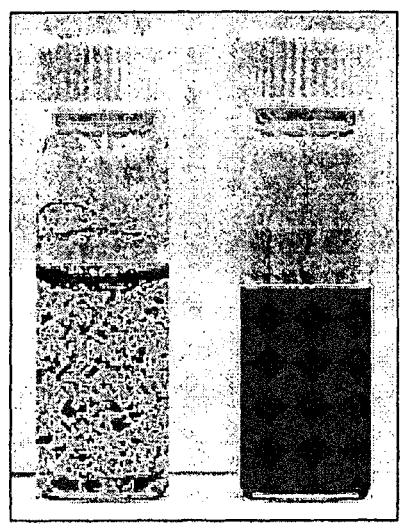
FIG. 4(a) is a photograph of FGS (left) and SDS-FGS aqueous dispersions (right)

Sodium dodecyl sulfate (SDS)—FGS aqueous dispersions were prepared by ultrasonication. Similar to the colloidal stabilization of CNTs using SDS shown in Bonard, J. M.; Stora, T.; Salvetat, J. P.; Maier, F.; Stockli, T.; Duschl, C.; Forro, L.; deHeer, W. A.; Chatelain, A. Purification and Size-Selection of Carbon Nanotubes. *Adv. Mater.* 1997, 9, 827-831 and Richard, C.; Balavoine, F.; Schultz, P.; Ebbesen, T. W.; Mioskowski, C. Supramolecular Self-Assembly of Lipid Derivatives on Carbon Nanotubes. *Science* 2003, 300, 775-778, the SDS-FGS aqueous dispersions were stable. Only minor sedimentation was observed after a week at room temperature as shown in FIG. 4a.

Figure 3:
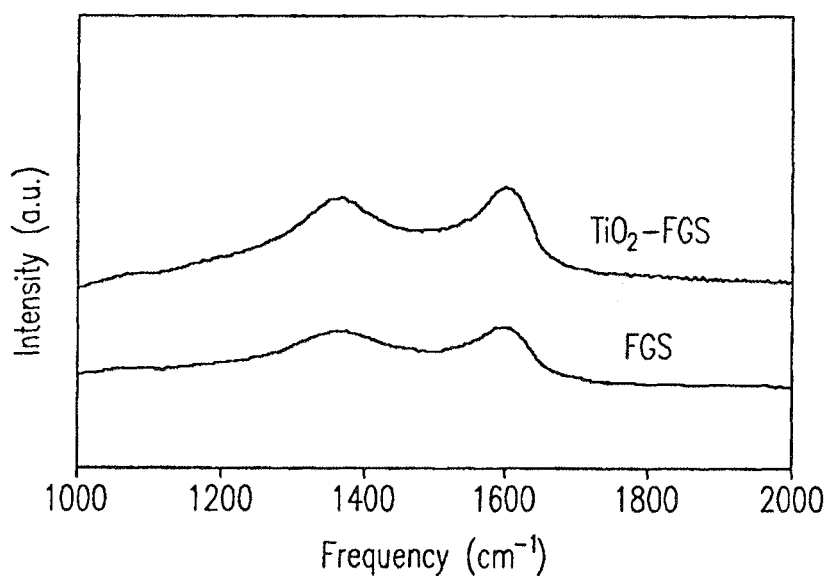
FIG. 3 are Raman spectra of rutile $TiO_2$—FGS and FGS in one embodiment of the present invention.
Figure 4B:
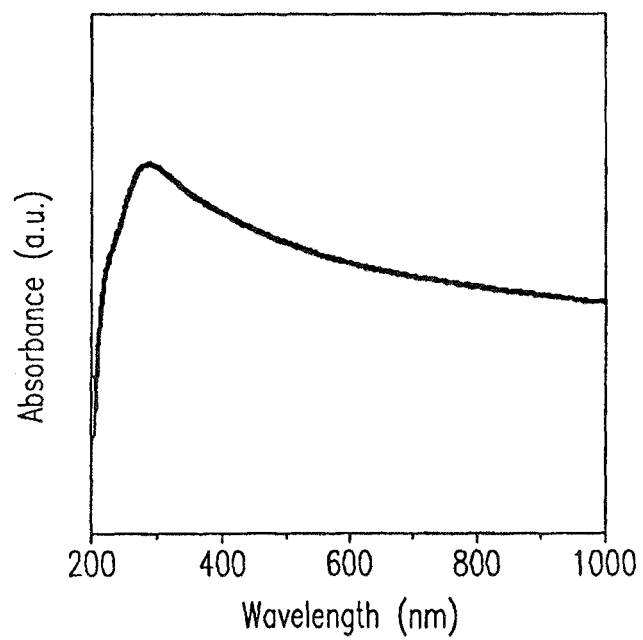
FIG. 4(b) is a graph of the UV-Vis absorbance of the SDS-FGS aqueous dispersion.

UV-Vis spectrum of the SDS-FGS dispersion showed an absorption peak at 275 nm with a broad absorption background (FIG. 4b) consistent with that of aqueous stable graphene sheets. Raman spectra of FGS and calcined $TiO_2$—FGS showed similar G and D bands structure of carbon, indicating that the structure of graphene is maintained during the synthesis procedure, as shown in FIG. 3.

A mild, low-temperature (below 100° C.) crystallization process was carried out to form crystalline $TiO_2$ with controlled crystalline phase (i.e., rutile and anatase) on the graphene sheets. The low temperature condition was also important in preventing aggregation of graphene sheets at elevated temperatures. Consistent with previous studies, by the low-temperature oxidative hydrolysis and crystallization, rutile $TiO_2$—FGS is obtained with a minor anatase phase. To obtain anatase $TiO_2$—FGS, additional sodium sulfate was added to the solution to promote the formation of the anatase phase. XRD patterns of the $TiO_2$—FGS hybrids shown in FIG. 5 show the formation of nanocrystalline rutile and anatase metal oxides with an estimated crystalline domain size of 6 and 5 nm, respectively.

Typical morphology of FGSs is shown in the transmission electron microscopy (TEM) image of FIG. 6a. The free standing 2D FGSs are not perfectly flat but display intrinsic microscopic roughening and out-of-plane deformations (wrinkles). More than 80% of the FGSs have been shown to be single sheets by AFM characterization, when they were deposited onto an atomically smooth, highly oriented pyrolytic carbon (HOPG) template. Some regions appeared as multilayers in the TEM images, which may represent the regions that either have not been fully exfoliated or the regions that have restacked together due to capillary and van der Waals forces experienced during the drying process.

Figure 6C:
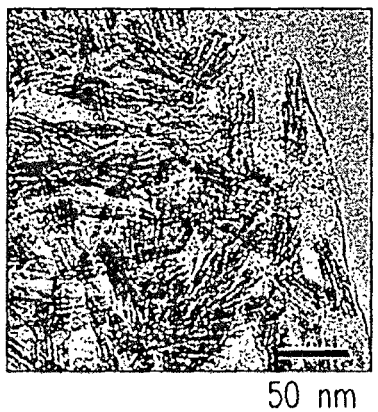

FIGS. 6b to 6e show TEM and scanning electron microscopy (SEM) images of as-grown rutile $TiO_2$—FGS hybrid nanostructures. FIGS. 6b and 6c show planar views of FGSs covered with nanostructured $TiO_2$. Both the edge of graphene and the nanostructure of the $TiO_2$ are clearly observable in the higher magnification image of FIG. 6c.

Figure 6D:
Figure 6E:
Figure 6F:
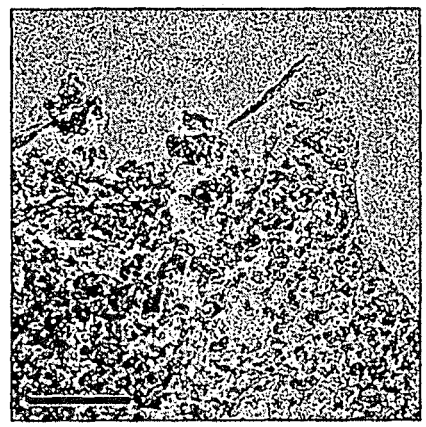
Figure 6G:
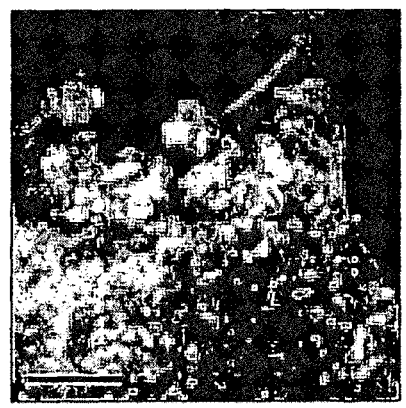

The nanostructured $TiO_2$ is composed of rod-like rutile nanocrystals organized in parallel interspaced with the SDS surfactants. The SEM image of FIG. 6d shows randomly oriented rod-like nanostructured rutile lying on the FGS. The cross-section TEM image further confirms that the nanostructured rutile mostly lies on the FGS with the rod length parallel to the graphene surface (FIG. 6e). FIGS. 6f and 6g show plane-view TEM images of anatase $TiO_2$—FGS hybrid nanostructures. FGSs underneath are covered with spherical aggregated anatase $TiO_2$ nanoparticles. The dark field TEM image (FIG. 6g) further confirms crystalline $TiO_2$ nanoparticles (bright regions) with a diameter of 5 nm spreading over the graphene surface.

Figure 12:
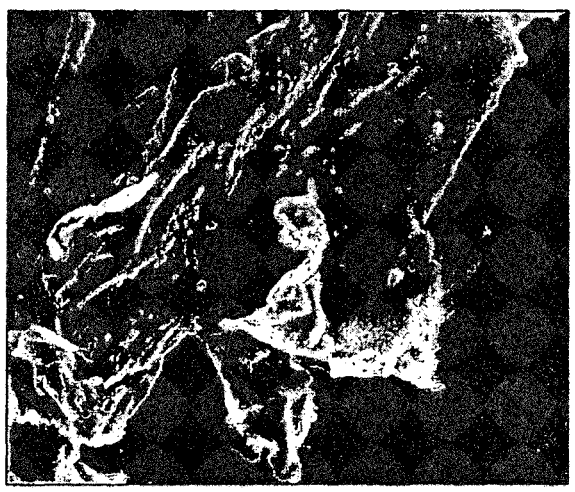
FIG. 12 is an SEM image of TiO$_2$/FGS hybrid materials made in one embodiment of the present invention without using SDS as a stabilizer. As shown, TiO$_2$ and FGS domains are separated from each other with minor TiO$_2$ coated on FGS.

It is important to note that the SDS surfactant determines the interfacial interactions between graphene and the oxide materials in promoting the formation of $TiO_2$-hybrid nanostructures. When the surfactant molecules are added, they can adsorb onto graphene through the hydrophobic tails making FGSs highly dispersed and interact with the oxide precursor through the hydrophilic head groups. The cooperative interactions between the surfactant, the graphene, and the oxide precursors lead to the homogeneous mixing of the components, in which the hydrophobic graphene most likely resides in the hydrophobic domains of the SDS micelles. As nanocrystalline $TiO_2$ formed, as-grown nanoparticles are then coated to the graphene surfaces since sulfate head groups have strong bonding with $TiO_2$. Without the surfactant, some of the surface functional sites (e.g., carboxylate, epoxy, and hydroxyl groups) on FGSs may provide bonding to $TiO_2$ nanoparticles. However, only a very small amount of the metal oxides will then be attached to graphene through such interactions due to the low number density of these functional groups on FGSs. Thus, in the control samples without the surfactant, FGSs are barely covered with the metal oxides along with phase separation from $TiO_2$ as shown in FIG. 12. This indicates the important role of SDS in the formation of the self-assembled hybrid nanostructures.

Figure 7A:
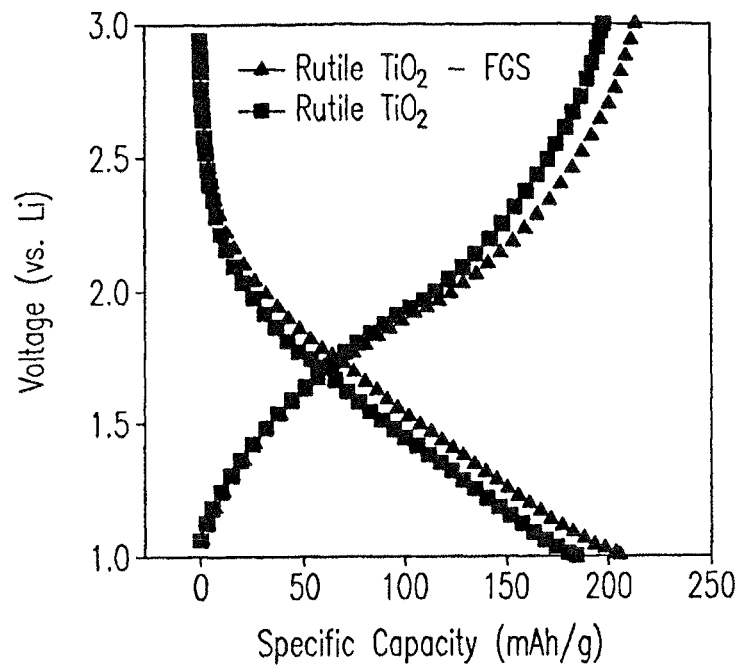
FIG. 7(a)-(f) are graphs showing the electrical performance of one embodiment of the present invention.
Figure 7B:
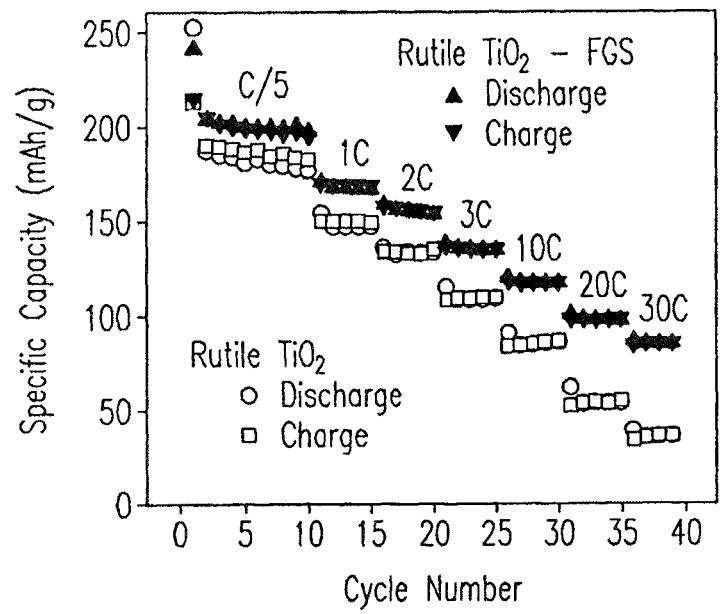

To examine the effectiveness of FGSs in improving the rate capability of the electrode, we investigated the Li-ion insertion/extraction properties in the $TiO_2$—FGS hybrid materials. The electrodes were fabricated in a conventional way by mixing the hybrid materials with Super P carbon additive and a PVDF binder and thus tested in Li-ion battery coin cell. The rutile $TiO_2$—FGS hybrid showed a slope profile of voltage-capacity relationship at both the charge and discharge state as shown in FIG. 7a, similar to that of control rutile $TiO_2$ and nanostructured rutile studied previously as reported in Hu, Y. S.; Kienle, L.; Guo, Y. G.; Maier, J. High Lithium Electroactivity of Nanometer-Sized Rutile $TiO_2$. *Adv. Mater.* 2006, 18, 1421-1426. As shown in FIG. 7b, with the incorporation of FGSs, the specific capacity of rutile $TiO_2$ in the hybrids (0.5 wt % FGS) increased at all charge/discharge rates compared with the control rutile $TiO_2$. The relative increase in specific capacity is especially larger at higher rates. For instance, at a rate of 30 C (2 min of charging or discharging), the specific capacity of the rutile $TiO_2$—FGS hybrid material is 87 mAh/g which is more than double the high rate capacity (35 mAh/g) of the control rutile $TiO_2$ as shown in FIG. 7b.

Figure 7C:
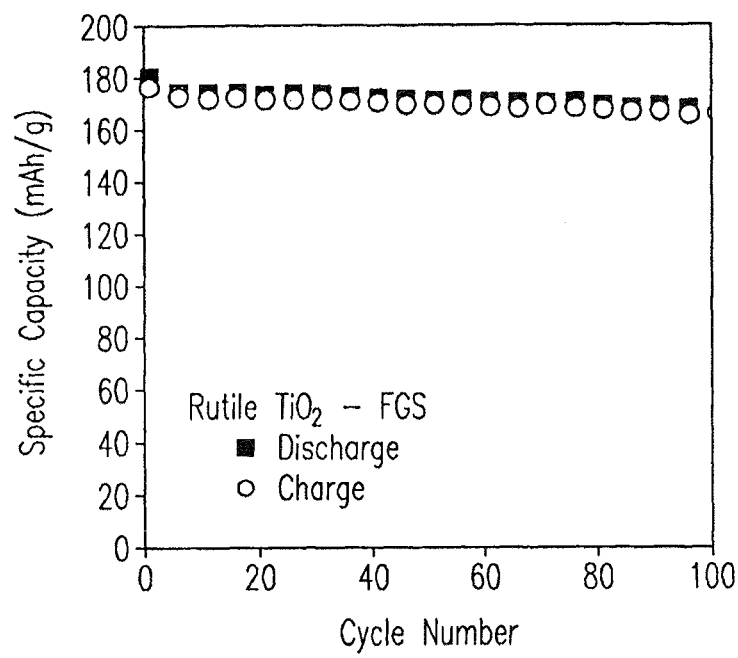
Figure 7D:
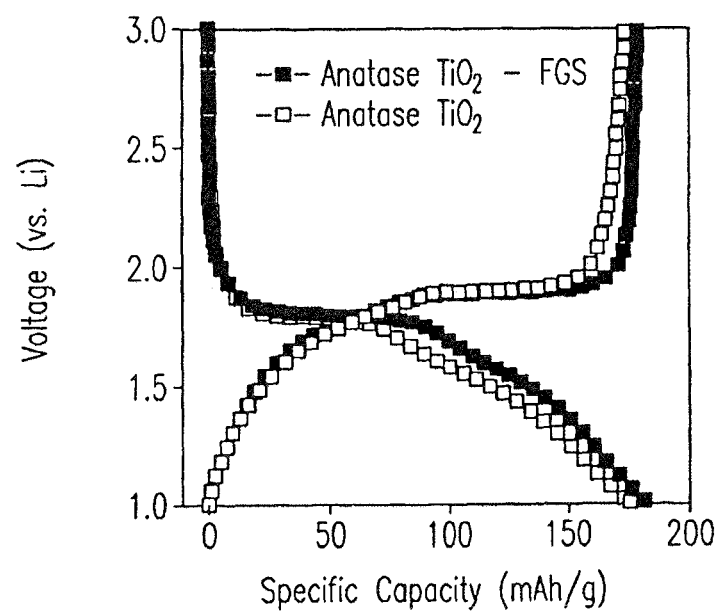
Figure 7E:
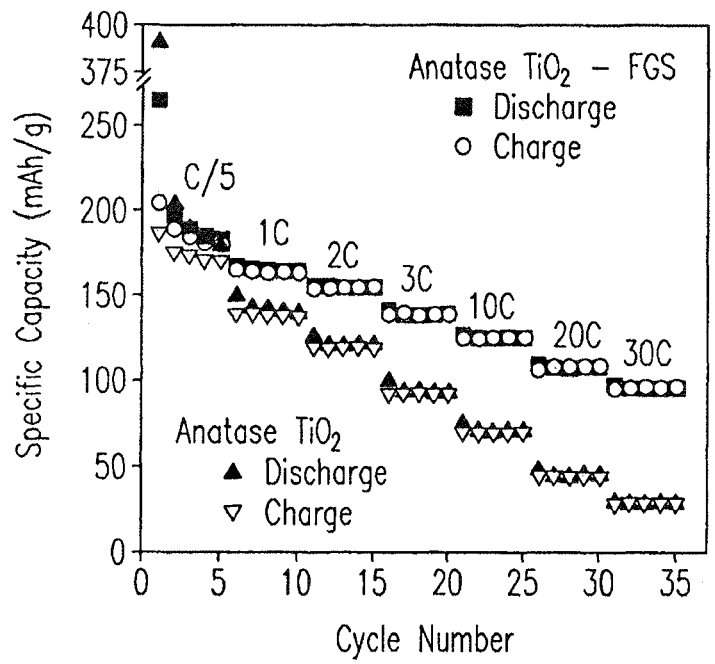
Figure 7F:
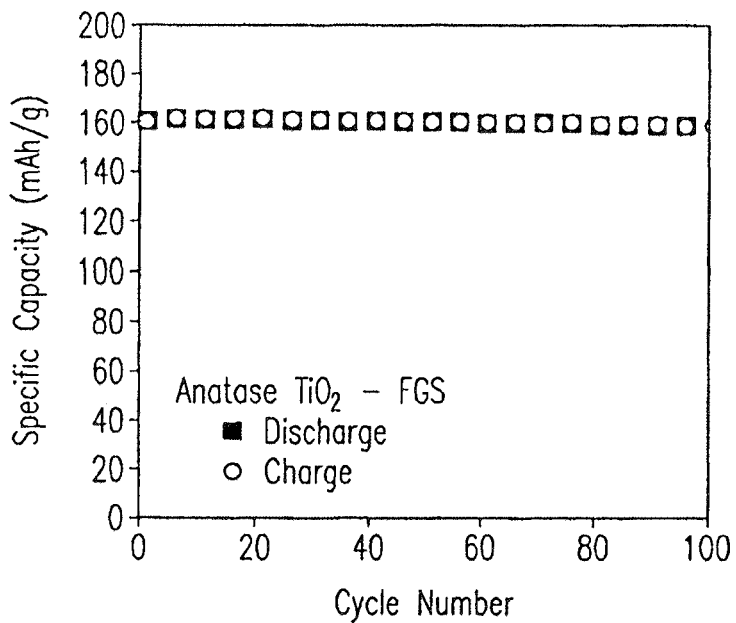
Figure 8:
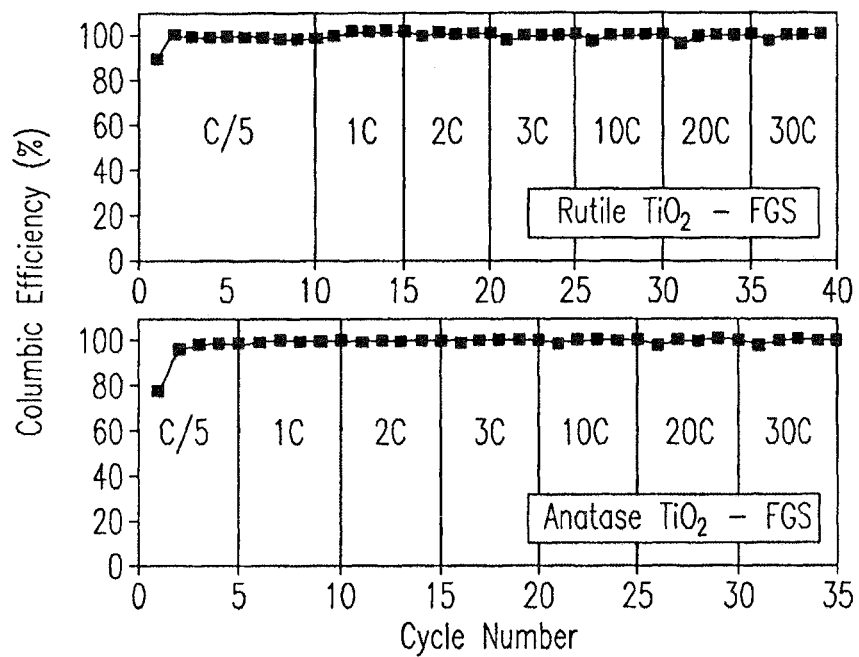
FIG. 8 is a graph showing a plot of coulombic efficiency versus cycle number of $TiO_2$—FGS hybrids of one embodiment of the present invention at various charge/discharge rate between 1~3 V vs. $Li/Li^+$.

The voltage-capacity profile of anatase $TiO_2$—FGS (2.5 wt % FGS) at C/5 rate shows plateaus around 1.8 V (discharge process) and 1.9 V (charge process) is shown in FIG. 7d, which is similar to that of control anatase $TiO_2$ and nanostructured anatase. The plateaus are related to the phase transition between the tetragonal and orthorhombic phases with Li insertion into anatase $TiO_2$. Similar to rutile $TiO_2$—FGS, the specific capacity of the anatase $TiO_2$—FGS hybrid is enhanced at all charge-discharge rates as shown in FIG. 7e. The specific capacity of the anatase $TiO_2$—FGS at the rate of 30 C is as high as 96 mAh/g compared with 25 mAh/g of control anatase $TiO_2$. Furthermore, the coulombic efficiencies of $TiO_2$—FGS hybrids at various charge/discharge rates are greater than 98% as shown in FIG. 8. Both rutile and anatase $TiO_2$—FGS hybrids show good capacity retention of the Li-ion insertion/extraction with over 90% capacity retention after 100 cycles at a 1 C rate, as shown in FIGS. 7c and 7f.

Figure 9:
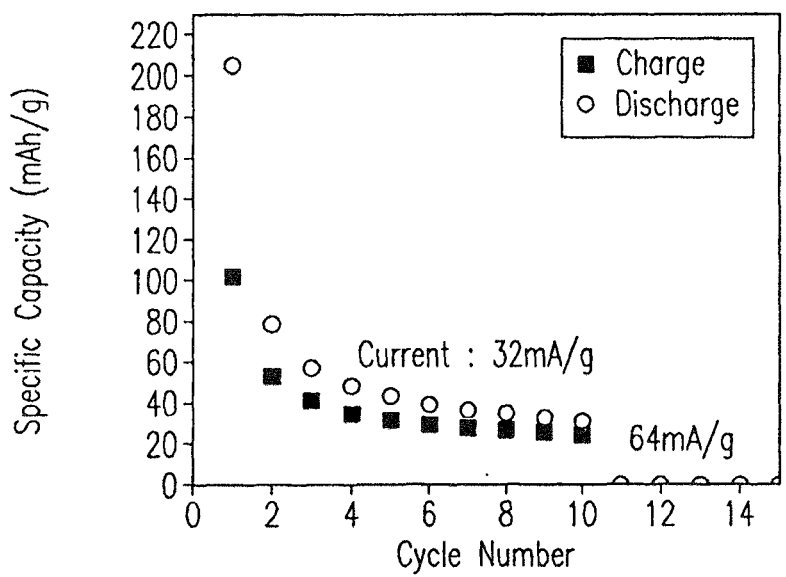
FIG. 9 is a graph showing the capacity of functionalized graphene sheets of one embodiment of the present invention as function of cycling numbers between 1~3 V vs. $Li/Li^+$.

To identify the capacity contribution from FGSs, the Li-ion insertion/extraction behavior of the FGSs was also studied. The initial capacity of FGS of 100 mAh/g with 50% irreversible loss is observed between 1~3 V potential window applied, which is consistent with a recent study of Li-ion storage in graphene described in Yoo, E.; Kim, J.; Hosono, E.; Zhou, H.-s.; Kudo, T.; Honma, I. Large Reversible Li Storage of Graphene Nanosheet Families for Use in Rechargeable Lithium Ion Batteries. *Nano Lett.* 2008, 8, 2277-2282. However, the specific capacity of FGS rapidly decreases to 25 mAh/g within 10 cycles. At higher charge/discharge rates, FGS has almost negligible Li-ion insertion as shown in FIG. 9. For 1 wt % FGS hybrids, the capacity contribution from FGS itself after 2 cycles can be a maximum value of 0.4 mAh/g. Thus, the increase of the specific capacity at high rate is not attributed to the capacity of the graphene additive itself in the hybrid materials.

Figure 10A:
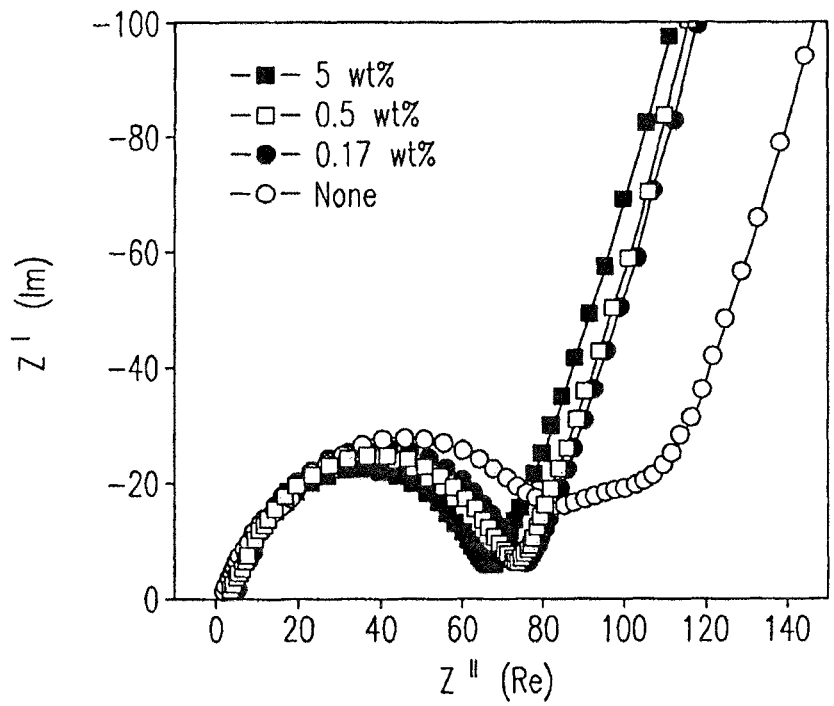
FIG. 10(a) is a graph showing the impedance measurement of coin cells using the electrode materials of control rutile $TiO_2$ and rutile $TiO_2$—FGS hybrids with different weight percentage of FGSs.

To further understand the improved high-rate performance, electrochemical impedance spectroscopy measurements on rutile $TiO_2$—FGS hybrid materials were performed after cycles. The Nyquist plots of the rutile $TiO_2$—FGS electrode materials with different percentage of graphene cycled in electrolyte, as shown in FIG. 10(a), all show depressed semicycles at high frequencies. As electrolyte and electrode fabrication are similar between each electrode, the high frequency semicircle should relate to the internal resistance of the electrode. We estimate that the resistivity of the cells decreased from 93Ω for the pure $TiO_2$ to 73Ω with the addition of only 0.5 wt % graphene.

Figure 10B:
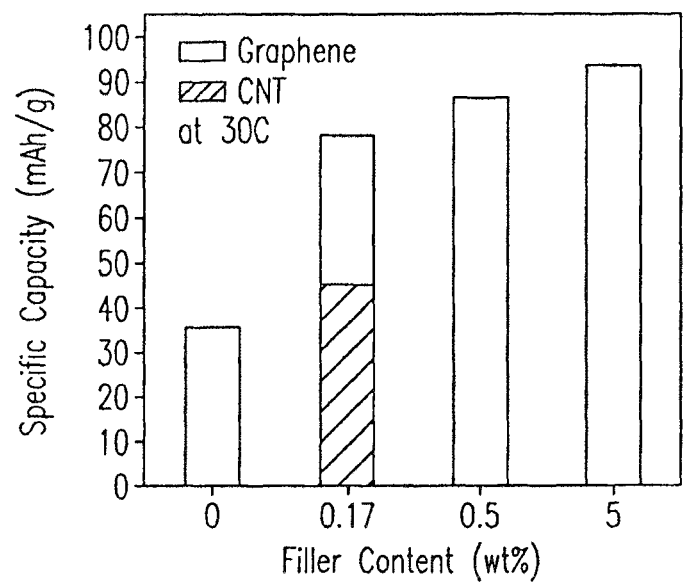
FIG. 10(b) is a graph showing the specific capacity of rutile $TiO_2$—CNT and rutile $TiO_2$—FGS at 30 C rate with different percentages of graphene.

By increasing the graphene percentage in the hybrid materials further, the specific capacity is slightly increased, e.g., to 93 mAh/g in the hybrid material with 5 wt % FGS, indicating that a kinetic capacity limitation may be reached by only improving the electrode conductivity with the incorporation of FGSs as shown in FIG. 10(b). Rutile $TiO_2$—CNT hybrids prepared and tested under similar conditions showed poorer performance at identical carbon loadings than the rutile $TiO_2$—FGS hybrid anodes, as shown in the yellow bar in FIG. 10(b). Similarly, hybrid nanostructures prepared using solution reduced graphene oxides also showed even poorer performance, indicating the importance of the highly conductive graphene phase of FGSs.

Figure 11:
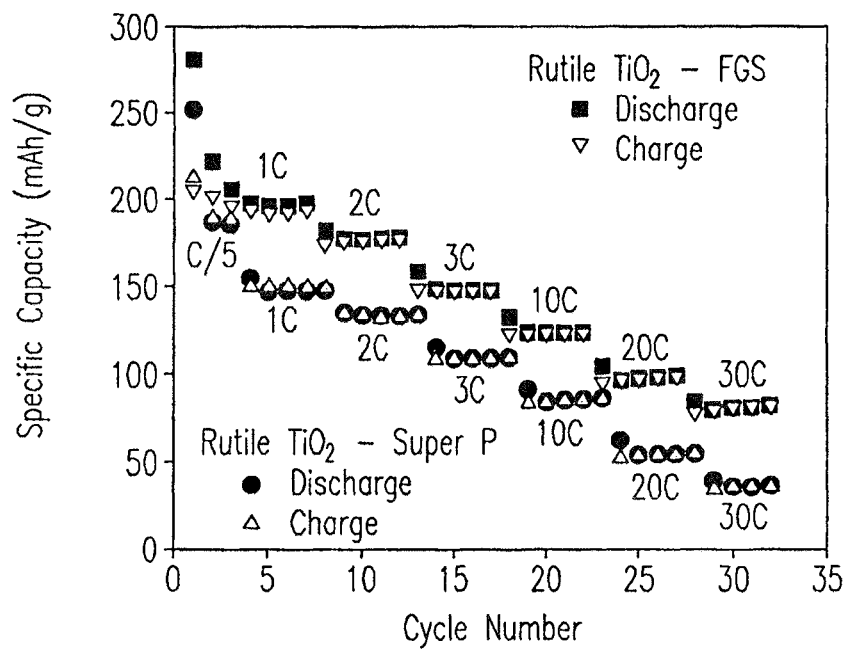
FIG. 11 is a graph showing the specific capacity of control rutile $TiO_2$ (10 wt % Super P) and rutile $TiO_2$—FGS hybrids (10 wt % FGS) at different charge/discharge rates. The rutile $TiO_2$—FGS hybrid electrode was prepared by mixing the calcined hybrid with PVDF binder at a mass ratio of 90:10. The control $TiO_2$ electrode was prepared by mixing control $TiO_2$ powder, Super P and PVDF binder at a mass ratio of 80:10:10.

To study the properties of electrode materials without any Super P carbon, Li-ion insertion/extraction properties of the rutile $TiO_2$—FGS (10 wt % graphene) were compared with control rutile $TiO_2$ with 10 wt % Super P at high charge-discharge rates. The hybrid material showed a much higher capacity at all charge-discharge rate, as shown in FIG. 11. This result indeed confirms that the graphene in the self-assembled hybrid materials is more effective than the commonly used Super P carbon materials in improving high rate performance of the electrode materials.

The high rate performance is important for applications where fast charge and discharge is needed, such as in load leveling utility applications. The simple self-assembly approach, and the potential low manufacturing cost of graphene of the present invention, thus provide a new pathway for large scale applications of novel hybrid nanocomposite materials for energy storage.

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding.

Thus, the specifics of this description and the attached drawings should not be interpreted to limit the scope of this invention to the specifics thereof. Rather, the scope of this invention should be evaluated with reference to the claims appended hereto. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary. Likewise, where the term "input" or "output" is used in connection with an electric device or fluid processing unit, it should be understood to comprehend singular or plural and one or more signal channels or fluid lines as appropriate in the context. Finally, all publications, patents, and patent applications cited in this specification are herein incorporated by reference to the extent not inconsistent with the present disclosure as if each were specifically and individually indicated to be incorporated by reference and set forth in its entirety herein.

The invention claimed is:

1. A method comprising:
providing graphene layers in a first mixture, the graphene layers having a first surface and a second surface and thicknesses of 0.5 to 50 nm;
dispersing the graphene layers with a surfactant;
adding a metal oxide precursor to said dispersed graphene layers to form a second mixture; and
precipitating the metal oxide from the second mixture on surfaces of the dispersed graphene layers to form a nanocomposite material comprising a metal oxide bonded directly to the first and second surfaces of a graphene layer with the metal oxide substantially uniformly distributed throughout the nanocomposite material.

2. The method of claim 1 wherein the graphene layers consist essentially of functionalized graphene sheets.

3. The method of claim 1 wherein the graphene layers consist essentially of 1 to 147 graphene sheets.

4. The method of claim 1 further comprising providing graphene layers prepared by thermal expansion before providing the graphene layers in the first mixture.

5. The method of claim 1 wherein the first mixture is an aqueous suspension.

6. The method of claim 1 wherein the surfactant is sodium dodecyl sulfate.

7. The method of claim 1 further comprising the step of heating the second mixture from 50 to 500° C. to condense the metal oxide such that the metal oxide is bonded directly to the surface of the graphene layer and remove the surfactant.

8. A method comprising:
   providing graphene layers in a first mixture, the graphene layers having a first surface and a second surface, and consisting essentially of 1 to 147 functionalized graphene sheets;
   dispersing the graphene layers with an anionic surfactant;
   adding a metal oxide precursor to said dispersed graphene layers to form a second mixture; and
   condensing the metal oxide from the second mixture on surfaces of the dispersed graphene layers and removing the surfactant to form a nanocomposite material comprising a metal oxide bonded directly to the first and second surfaces of the graphene layers with the metal oxide substantially uniformly distributed throughout the nanocomposite material.

9. The method of claim 1 wherein the graphene layers have thicknesses of 2 to 10 nm.

10. The method of claim 9 wherein the graphene layers consist essentially of functionalized graphene sheets.

11. The method of claim 1 wherein the surfactant is sodium dodecyl sulfate.

* * * * *